Oct. 7, 1952     S. L. JANOWSKI     2,612,973
CLUTCH CONTROL MECHANISM

Filed May 26, 1950                                3 Sheets-Sheet 1

INVENTOR
STEPHEN L. JANOWSKI
BY
H. O. Clayton
ATTORNEY

Oct. 7, 1952     S. L. JANOWSKI     2,612,973
CLUTCH CONTROL MECHANISM
Filed May 26, 1950     3 Sheets-Sheet 2
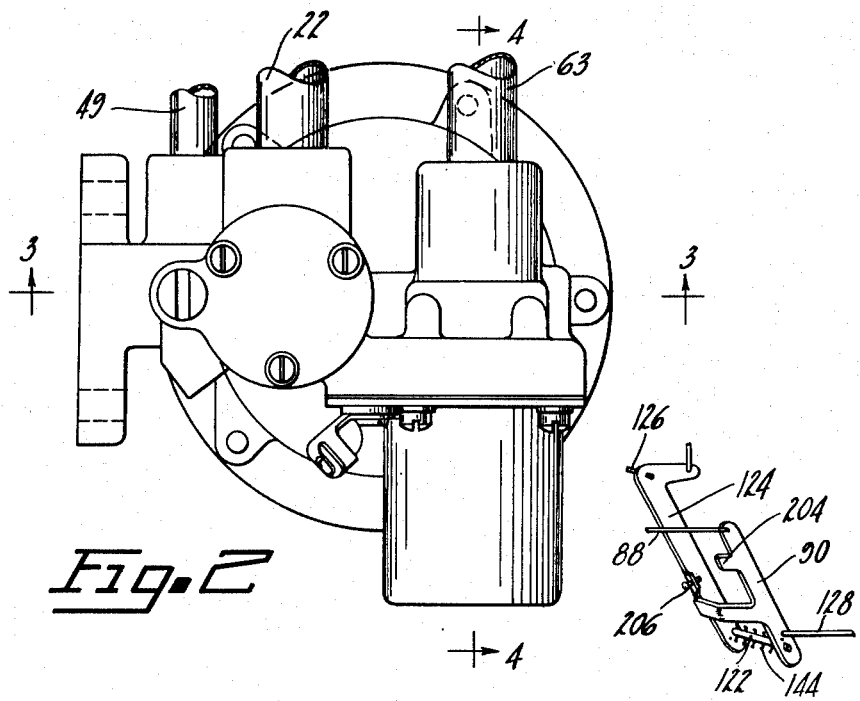
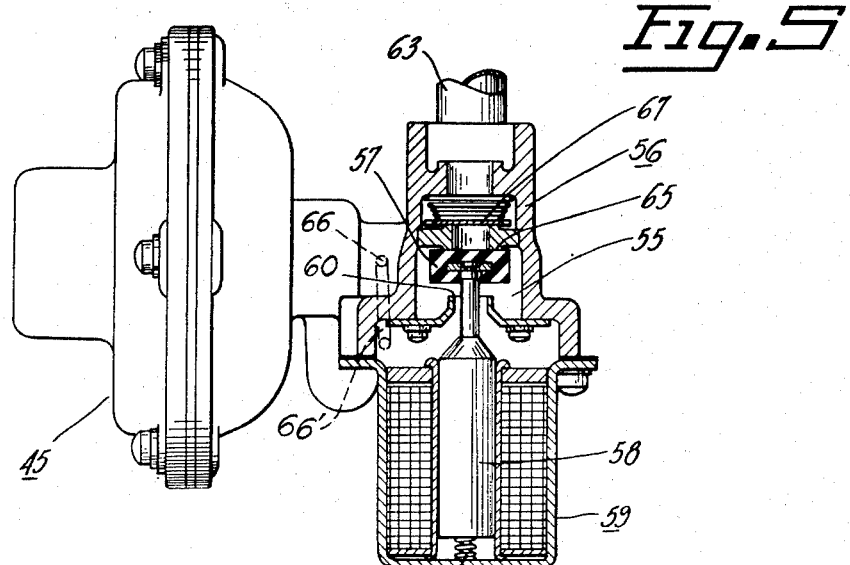
INVENTOR
STEPHEN L. JANOWSKI
BY
H. O. Clayton
ATTORNEY Oct. 7, 1952 S. L. JANOWSKI 2,612,973
CLUTCH CONTROL MECHANISM
Filed May 26, 1950 3 Sheets-Sheet 3
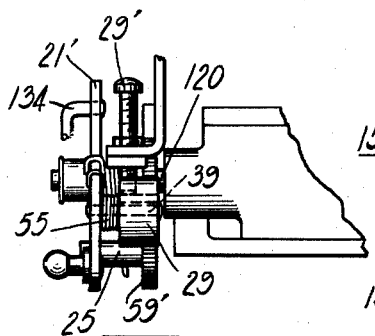
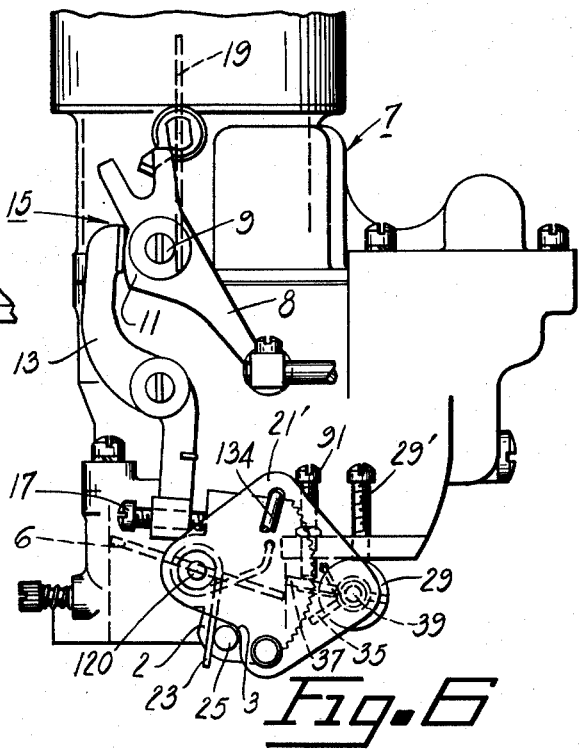
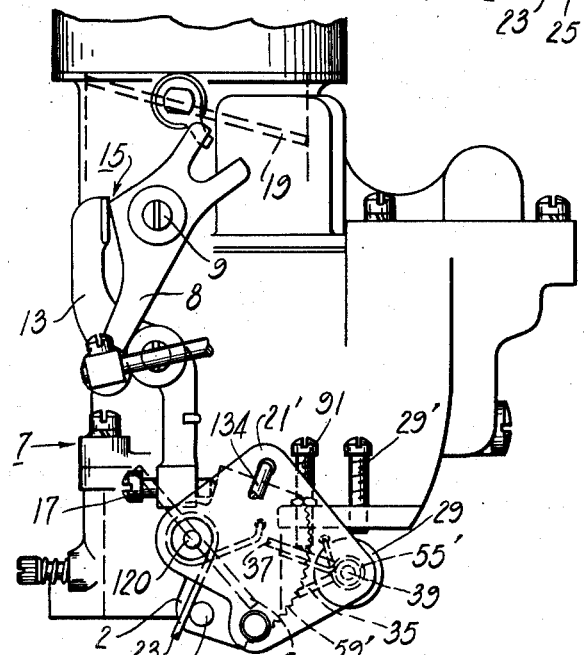
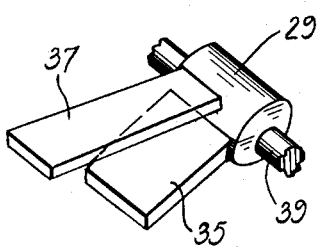
INVENTOR.
STEPHEN L. JANOWSKI
BY
H. O. Clayton
ATTORNEY Patented Oct. 7, 1952

2,612,973

UNITED STATES PATENT OFFICE 2,612,973

CLUTCH CONTROL MECHANISM

Stephen L. Janowski, South Bend, Ind., assignor to Bendix Aviation Corporation, South Bend, Ind., a corporation of Delaware Application May 26, 1950, Serial No. 164,505

8 Claims. (Cl. 192—.075)

1

This invention relates in general to means for operating the throttle and friction clutch of an automotive vehicle and particularly to pressure differential operated clutch operating power means controlled in large part by an operation of the accelerator of the vehicle.

One of the principal objects of my invention is to provide a throttle and clutch operating mechanism effecting a smooth engagement of the clutch under all normal conditions of service including a smooth engagement when the engine of the vehicle is either warm or cold. When the internal combustion engine of the automotive vehicle is relatively warm a certain depression of the accelerator will effect a higher R. P. M. of the pistons thereof than when the engine is relatively cold; however, with the throttle and clutch operating mechanism of my invention the R. P. M. resulting from a given depression of the accelerator will be of the same or substantially the same value irrespective of whether or not the engine is warm or cold. Accordingly the mechanism of my invention effects a smooth engagement of the clutch under all normal conditions of service there being sufficient engine torque to effect this result.

Yet another object of my invention is to combine, in an automotive vehicle including an accelerator, an internal combustion engine controlled in part by a throttle, and a friction clutch, an accelerator controlled clutch control mechanism with a throttle controlling mechanism whereby there is provided means for effecting a smooth engagement of the clutch under all normal conditions of service and with a normal operation of the accelerator.

A further object of my invention is to combine, with an accelerator controlled clutch control mechanism of an automotive vehicle, means for regulating the operation of the throttle of the vehicle whereby there is effected the desired operation of the throttle as the accelerator is operated to effect a clutch engaging operation of the clutch control mechanism.

The above and other objects and features of the invention will appear more fully hereinafter from a consideration of the following description taken in connection with the accompanying drawings where one embodiment of the invention is illustrated by way of example.

Figure 2 is a plan view looking at one end of the valve mechanism of my invention;

Figure 1:
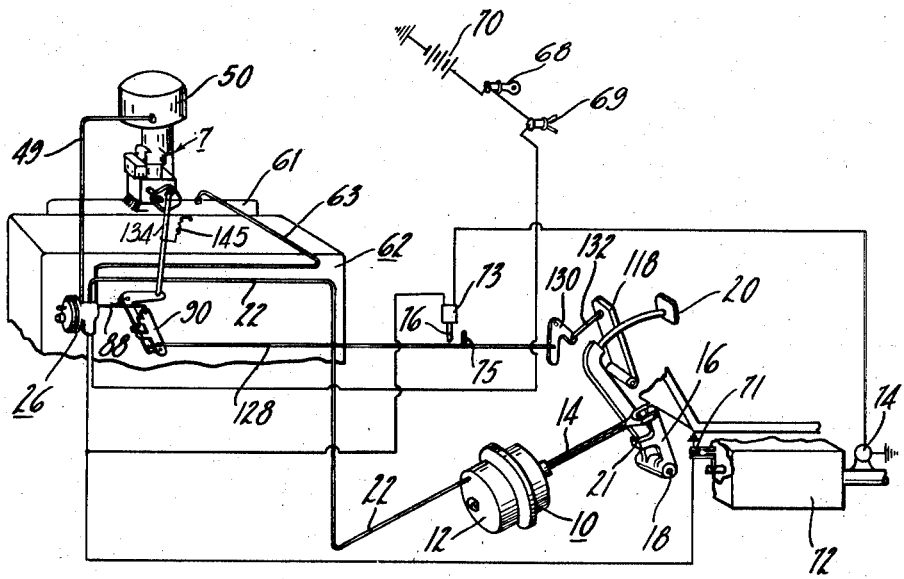
Figure 1 is a diagrammatic view disclosing the principal features of my invention.

2 on the line 3—3 of Figure 2 of the control valve mechanism of my invention;

Figure 4 is a view partly in section, taken on the line 4—4 of Figure 2 disclosing details of the solenoid operated vacuum cut-in valve of the valve mechanism;

Figure 5 is a view disclosing the principal parts of the connection interconnecting the accelerator, the throttle and the control valve;

Figure 6 is a view disclosing the parts of the high idle compensator mechanism of my invention in their off position;

Figure 7 is another view of the high idle compensator mechanism of my invention the accelerator operated ratchet lever thereof being shown in position locked up with the ratchet plate of the mechanism;

Figure 8 is an end view of the compensator mechanism of Figures 6 and 7; and

Figure 9 is a view disclosing the pawl mechanism of the ratchet mechanism.

Describing now that embodiment of my invention disclosed in the several figures of the drawings the principal elements thereof consist of a single acting vacuum motor 10 comprising a casing 12 and a power element such as a piston, not shown, which is connected to a friction clutch, not shown, of a conventional design. One end of the casing of the motor, a portion of the body thereof and the power element together outline a control chamber, a gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism.

Figure 3:
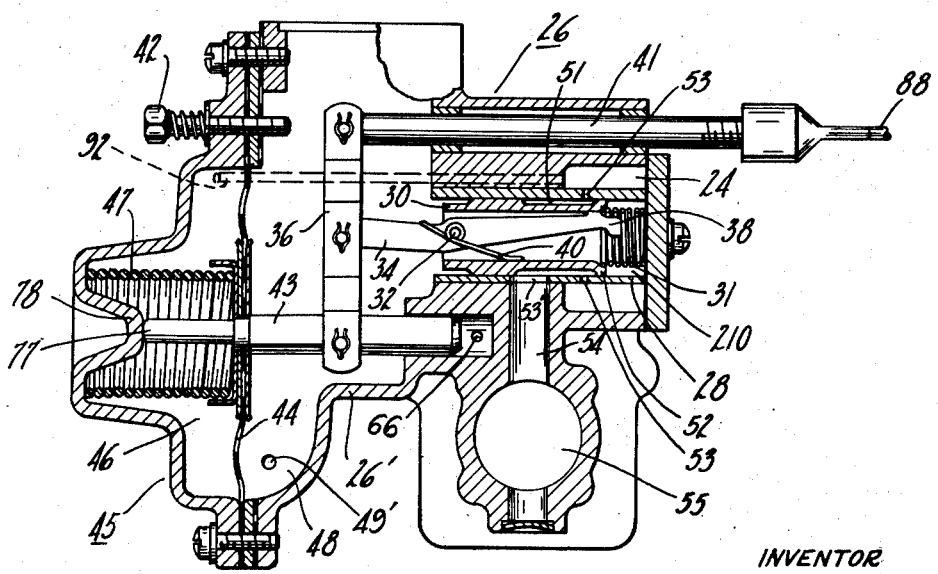
Figure 3 is a longitudinal sectional view taken

One end of the motor 10, that is the end of the same constituting a part of the aforementioned power compartment of the motor, is connected by a conduit 22 to a compartment 24 of a control valve unit indicated as a whole by the reference numeral 26 and three different views of said unit are disclosed in Figures 2 to 4 inclusive. The casing 26' of the unit 26 is provided with a cylindrically shaped bore to receive a cylindrical sleeve valve member 28 constituting one of the two parts of a three-way valve; and said casing is counterbored to provide the aforementioned compartment 24, Figure 3.

A valve member 30, which is biased inwardly by a spring 31 and which is provided with a cylindrically shaped bore to permit the passage of air therethrough, constitutes the other part of the two part three-way valve. One end of the latter valve member, is provided with diametrically spaced openings to receive therethrough a pin 32 and said pin extends through a connecting pin 34, one end of which extends within the member 30. The other end of the pin 34 extends beyond the valve member 30 and is detachably connected to a two-part lever 36. The end portion 38 of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figure 3, the lever 36 is pivotally connected at one of its ends to a rod 41; and the movement of the rod to the left, Figure 3, is limited by a stop pin 42 adjustably mounted in the valve casing. The other end of the lever 36 is pivotally connected to a pin 43 which is slidably received at one of its ends in a portion of the valve casing and which is secured at its other end to a flexible diaphragm 44. This diaphragm constitutes the power element of a valve operating pressure differential operated motor indicated as a whole by the reference numeral 45; and the operation of said motor is in large measure controlled by the gaseous pressure within the control compartment 46 of said motor, and by a compression spring 47 within said compartment. A compartment 48 of the motor 45 is vented to the atmosphere via a port 49' to which is connected a conduit 49 which leads to an air cleaner 50, Figure 2.

The valve member 30 is recessed at 51 and the end of said member provides a land portion 52 which is adapted, in the operation of the valve, to be positioned to register the recess 51 with ports 53 in the valve member 28. The member 30 is also operated so that the land portion 52 covers the ports 53, that is, laps the valve and is also operated to interconnect said ports with the air cleaner 50 via the compartment 48 and the interior of the valve.

The valve member 28 is provided with an opening 53' to register with one end of a duct 54 in the valve casing, said duct registering at its other end with a chamber 55 of a three-way vacuum cut-in valve indicated as a whole by the reference numeral 56 and disclosed in detail in Figure 4. The latter valve includes a valve member 57 secured to one end of an armature 58 of a solenoid 59. When the solenoid 59 is energized the valve member 57 moves downwardly, Figure 4, to seat at 60, thereby connecting the duct 54 with the intake manifold 61 of the internal combustion engine 62 of the vehicle via a conduit 63 and the aforementioned chamber 55; and when the solenoid 59 is deenergized, a spring 64 serves to move the armature upwardly, Figure 4, to seat the valve member 57 at 65, thereby cutting off the vacuum connection and venting the duct 54 to the atmosphere via the air cleaner 50, chamber 48 of the motor 45, the recess in the valve casing which houses the outer end of the pin 43, ducts 66 and 66' in the valve casing, and the chamber 55. A spring loaded check valve 67 may be included in the vacuum connection between the intake manifold and the valve chamber 55 thereby providing a means for maintaining the clutch disengaged in the event the conduit 63 is broken when the motor 10 is energized.

Completing the description of the valve unit 26 the casing 26' is provided with a duct 92, Figure 3, permanently interconnecting the control compartment 46 of the motor 45 with the aforementioned valve compartment 24. There is thus provided fluid transmitting means for at all times interconnecting the motor compartment 46, the valve compartment 24, and the control compartment of the clutch operating motor 10. It follows therefore that the operation of the clutch control mechanism constituting my invention is in large part controlled by controlling the gaseous pressure within the valve compartment 24.

There is thus provided a compact valve control unit 26 comprising a multi-sectional casing housing a three-way control valve and also housing means for operating said valve comprising a spring and pressure differential operated motor and an accelerator operated pin, said pin and the power element of the motor being connected with the movable part of said valve by means of a floating lever member.

Describing now the force transmitting means interconnecting the accelerator 118 of the car with a throttle operating shaft 120 and with the valve operating pin 41, said pin is connected to a rod 88 and this rod is pivotally connected with a lever member 90. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve mechanism of a carburetor 7 by means of a link 134 and a high idle compensator mechanism 15 disclosed in Figures 6 to 8, inclusive. This mechanism, which is described in detail hereinafter, constitutes an important feature of my invention and when combined with the clutch control mechanism of the invention cooperates therewith to effect a smooth engagement of the clutch under all normal conditions of service.

A spring 144, which is weaker than a throttle return spring 145, is operative, together with the spring 145, to return the accelerator to its throttle closed position and to move the valve member 30 to the right, Figure 3, to open the three-way valve, that is operate the same to effect a clutch disengaging operation of the motor 10. The spring 144 is preferably sleeved over the pin 122 and is connected at its ends to the levers 90 and 124. The operation of this part of the mechanism of my invention will be described in greater detail hereinafter when the operation of the entire clutch control mechanism is described in detail.

Describing the aforementioned high idle compensator mechanism of my invention said mechanism includes a ratchet plate 2 mounted on and drivably connected to the throttle opening shaft 120 said shaft preferably serving to operate two throttles or often called butterfly valves which may be mounted on the shaft. Only one of said valves is disclosed in the drawings and is indicated by the reference numeral 6. The ratchet plate 2 is angularly moved, to open the throttle valves a limited amount, by a lever 8 pivotally mounted on a shaft 9 mounted in the casing of the carburetor. This lever is provided with a high idle cam portion 11 which is adapted to contact one end of a lever 13. The lever 8 is rotated either by a manually operated force transmitting means extending to and mounted in the instrument panel of the vehicle or by any one of the automatic choke mechanisms of the day. When the lever 13 is rotated a threadedly mounted idle stop adjustment screw 17 in the end thereof contacts the ratchet plate 2 to effect the aforementioned angular movement of said plate; and as disclosed in Figures 6 and 7 this operation also serves to close a carburetor choke valve 19.

The high idle compensator mechanism also includes a ratchet lever 21' which is pivotally mounted on the shaft 120; and the ratchet plate 2 is biased into juxtaposition with the ratchet lever 21' by a preloaded torsion spring 23 sleeved over said shaft. One end of this spring is secured to the ratchet lever 21' and the other end thereof abuts a stop 25 secured to the ratchet plate. A ratchet pawl mechanism including, as a unit, a cylindrically shaped member 29, a pawl member 35, and a projection or stop member 37, is pivotally mounted on a pin 39 mounted in and extending laterally from the ratchet lever 21', all as is disclosed in Figures 6, 7, and 8 of the drawings. The pawl 35 is biased upwardly, Figure 7, by a preloaded torsion spring 55' into mesh with teeth 59' on the outer periphery of the ratchet plate.

When the accelerator 118 is released the throttle return spring 145, which is stronger than the return springs 23, 55', and 144, serves to move the ratchet plate, the ratchet lever, and the pawl mechanism as a unit in a counterclockwise direction about the shaft 120; and the movement of these several parts is halted by the cylinder 29 coming into contact with a stop member 29' adjustably mounted in the carburetor casing. This operation, that is the counterclockwise movement of the ratchet plate, etc. as a unit, also serves to move the stop 37 of the pawl mechanism into contact with a stop 91 adjustably mounted in the carburetor casing said operation further tensioning the preloaded spring 55'; and this operation results in the pawl 35 leaving the teeth 59' and moving to the position disclosed in Figure 6. After the pawl has left the teeth the return spring 23 functions to return the ratchet plate 2 to the position disclosed in Figure 6, that is, the position in immediate juxtaposition with the lever 21'.

There is thus provided, by the ratchet plate 2, the ratchet lever 21', and the pawl mechanism 29, 35, and 37, a ratchet mechanism serving as part of the force transmitting means interconnecting the choke operating means, not shown, the accelerator 118, and the throttle valve 6. When the choke operating means is actuated to increase the engine idle R. P. M. of the engine the ratchet plate 2 is moved in a clockwise direction to the position disclosed in Figure 7; and during the first increment of throttle opening movement of the accelerator the ratchet lever is moved to the position disclosed in this figure the preloaded spring 55' serving, by its movement of the pawl 35 in a clockwise direction, to bring said pawl into mesh with the teeth 59' the particular tooth engaged depending upon the degree of opening of the choke mechanism. A subsequent and continued throttle opening movement of the accelerator then serves to increase the degree of opening of the throttle the parts of the ratchet mechanism moving together as a unit. As explained above a release of the accelerator to its throttle off position will then result in a full closure of the throttle valve 6 and its companion valve, not shown. If the high idle compensator mechanism, including the levers 8 and 13 and the ratchet mechanism, is not brought into play then a throttle opening movement of the accelerator results in a recess portion 3 of the ratchet lever 21' contacting the stop 25 to open the throttle there being, as is disclosed in Figure 6, but a very little lost motion between these parts of the mechanism. However, if the high idle compensator mechanism is opened prior to a throttle opening movement of the accelerator, then the ratchet mechanism, with the parts thereof in the position disclosed in Figure 7, moves as a unit in a clockwise direction to open the throttle.

Describing now a feature of my invention, the solenoid 59 which operates the vacuum cut-in valve 56, is controlled by the electrical controls disclosed in Figure 1. Describing this mechanism a grounded battery 70 is wired in series with an ignition switch 68, a clutch control cutout switch 69 preferably mounted in the instrument panel of the vehicle, the solenoid 59, and a grounded switch 71 which is opened by the second and high gear shift rail of the transmission 72 when the transmission is established in its high gear setting. With this electrical hookup the valve 56 is opened, that is, the valve member 57 is seated at 60, when the switches 68 and 69 are closed and the transmission is established in any gear except high gear; accordingly, with the vacuum cut-in valve opened there is provided a source of vacuum to make possible a clutch disengaging operation of the motor 10 when the accelerator is released to open the valve 28, 30 an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic; and to effect this operation of the mechanism of my invention there is provided a switch 73 which is closed when the accelerator is released to close the throttle, and a grounded switch 74 which is operated by a vehicle speed responsive governor, not shown. To effect the operation of the switch 73 there is provided a flange 75 on the rod 128, said flange being contactable with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and it follows, therefore, that the switch 73 is not opened until after the throttle has been opened to a limited degree.

Describing now the complete operation of the mechanism constituting my invention and incidentally completing the description of the parts thereof not heretofore described, when the accelerator 118 is released to close the throttle and idle the internal combustion engine 62, the intake manifold 61 of said engine is partially evacuated. As to the closing of the throttle it is to be remembered that in effecting this operation the that is, when their vacuum creating pulling power has decreased to a certain factor, then the spring 47 automatically moves to the right, Figure 3, that is, expands, thereby lapping the three-way valve 28, 30. Describing this operation of said valve the valve member 30 moves to the right until the ports 53 register with the land portion 52 of said valve member; and when this occurs the flow of air into the chamber 46 and the motor 10 is automatically cut off and the system is then in equilibrium.

In this operation the lever 90 rotates counterclockwise about the pivotal connection between the pin 122 and said lever, said pivotal connection acting as a fulcrum. As stated above, the parts of the mechanism of my invention are so constructed and arranged, particularly the strength or load of the clutch springs, the area of the diaphragm 44 and the rate of the spring 47, that the valve is lapped to arrest the movement of the power element of the clutch motor when the clutch plates are just slightly in contact with each other.

This operation of the motor 10 is usually described as the first stage operation thereof and it is to be particularly noted that by varying the rate of the spring 47 that the termination of the first stage operation of the motor may be varied. In other words, by varying the rate of the spring 47 there is provided means for varying the degree of contact of the clutch plates when the first stage of clutch engaging operation of the motor 10 is completed. It is also to be noted that the mechanism of my invention is preferably so constructed that this first stage of clutch engaging operation of said motor is completed before the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 124 to open the throttle beyond its idling position; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the clutch motor compartment 46 and the control compartment of the clutch motor 10 in communication with the atmosphere, thereby increasing the gaseous pressure therein. The clutch springs then automatically resume their expansion to force the clutch plates into contact with each other. As before, if the driver arrests the movement of the accelerator after this resumption of movement of the valve member 30 said member again moves to its lapped position by virtue of a resumption of the expansion of the spring 47. In this valve lapping operation the direction of movement of the valve member 30 is again reversed, the lever 36 fulcruming about its connection with the pin 41.

As with the above described first stage of clutch engaging operation of the mechanism the spring 47 expands to move the valve member 30 to its lapped position when the differential of pressure acting on the diaphragm 44 is reduced to a certain factor by the flow of air into the chamber 48. As with the first stage operation of the mechanism, the valve is lapped when the force exerted by the spring 47 equals the force exerted by the diaphragm 44.

The clutch plates are thus first moved just slightly into engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is the operation to effect the relatively rapid movement of the clutch plates up to a point in slight engagement with each other, will, by virtue of the relatively fast movement of the valve member 30 and its degree of movement during the initial increment of movement of the accelerator, be effected very quickly. The second stage clutch engaging operation of my clutch control mechanism is effected more slowly inasmuch as the bell crank lever 124 is operated as a throttle operating lever of the first class, the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed before the opening movement of the throttle is initiated. The adjustable stop 42 serves to control the mechanism to limit the clutch plate loading factor said factor preferably being such as to prevent a stalling of the engine.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher gear ratio setting.

There is thus provided, by the friction clutch control mechanism of my invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. In this clutch disengaging operation of the power means the accelerator, in its operation of the three-way valve 28, 30 cooperates with the governor in its operation of closing the switch 74 and the accelerator 118 in its operation of closing the switch 73. As to the clutch engaging operation of the power means of my invention, said operation is effected, through the intermediary of the floating lever 36, by an operation of the accelerator and an operation of the valve operating motor 45. It is also to be noted that with the clutch control mechanism of my invention if the driver should fail to depress the accelerator to operate the valve 28, 30 just after the transmission is established in its high gear setting, that the bleed of air into the motor 10 via the ducts 66 and 66' will nevertheless insure an engagement of the clutch. This operation of the mechanism might be effected if the transmission were placed in its high gear setting just before the vehicle started to descend a grade.

The valve mechanism of my invention insures a two stage operation of the clutch motor and a resulting smooth engagement of the clutch, with any mode of operation of the accelerator; for the operation of the leverage changing force transmitting connections and the throttle spring 145 virtually insure this two stage operation of the mechanism when the clutch is engaged as a result of a normal operation of the accelerator. The floating lever 36 interconnecting the reciprocable valve member 30 with the accelerator operated pin 41 and the power element 44 of the valve operating motor 45, provide a very simple, yet effective, means for operating the three-way control valve 28, 30; the varying of the rate of the spring 47 provides a means for determining when the first stage of engagement of the clutch is completed; the particular force transmitting means interconnecting the throttle valves, the valve member 30 and the accelerator 113 insures a completion of the first stage of engagement of the clutch just as the throttle is about to be opened; and the step by step clutch engaging or disengaging operations of the power element of the clutch motor insures the desired maneuvering of the vehicle in traffic or when the vehicle is being parked.

However, the most important feature of my invention lies in the combination of the particular high idle compensator mechanism of the invention with the particular clutch control mechanism thereof whereby there is provided a mechanism effecting a smooth engagement of the clutch despite a relatively low temperature of the internal combustion engine of the vehicle when the engagement of the clutch is to be made from a standing start; for when the engine is cold the driver need but operate the high idle compensator mechanism to its open position and thereafter, upon depressing the accelerator, there will insue the desired smooth engagement of the clutch the engine speed at the time being equal or substantially equal to a warm engine. There is then enough engine torque to effect the desired engagement of the clutch and this despite the coldness of the engine at the time; for the operation of the high idle mechanism results in a stepping up of the engine R. P. M. to a factor equaling or substantially equaling that in effect when the engine temperature is normal and the accelerator is released to idle the engine. When the engine is idling under normal conditions, that is when the engine is relatively warm, then it is not necessary for the driver to open the high idle compensator mechanism to effect the necessary engine R. P. M. resulting in the desired smooth first engagement of the clutch.

It is thought that the invention and many of its attendant advantages will be understood from the foregoing description and though said invention has been illustrated in connection with but one modification thereof it will be apparent that various changes may be made in the form, construction and arrangement of the parts without departing from the spirit and scope of the invention or sacrificing all of its material advantages, the form hereinbefore described being merely a preferred embodiment.

I claim:

1. In an automotive vehicle provided with an engine controlling throttle, a clutch, an accelerator for controlling the operation of the throttle and clutch, and manually operated means for opening the throttle; a motor operably connected to the clutch, valve means for controlling the operation of the motor, and force transmitting means interconnecting the accelerator, the manually operated means for opening the throttle, the throttle, and the valve means, said force transmitting means including means operated by the manually operated throttle opening means for opening the throttle independently of its operation by the accelerator.

2. In an automotive vehicle provided with an engine controlling throttle, a clutch, an accelerator for controlling the operation of the throttle and clutch, and manually operated means for opening the throttle; a motor operably connected to the clutch, valve means for controlling the operation of the motor, and force transmitting means interconnecting the accelerator, the manually operated means for opening the throttle, the throttle, and the valve means including an adjustable means operable to make possible an opening of the throttle independently of its operation by an actuation of the accelerator.

3. In an automotive vehicle provided with an engine controlling throttle, a clutch, an accelerator for controlling the operation of the throttle and clutch, and manually operated means for opening the throttle; a motor operably connected to the clutch, valve means for controlling the operation of the motor, and force transmitting means interconnecting the accelerator, the manually operated means for opening the throttle, the throttle, and the valve means including an adjustable means operable to make possible an opening of the throttle independently of its operation by an actuation of the accelerator, and further including a lost motion connection whereby the valve is operated, to effect a part of the clutch engaging operation of the motor, before the throttle is opened.

4. In an automotive vehicle provided with an engine controlling throttle, a clutch, an accelerator for controlling the operation of the throttle and clutch, and manually operated means for opening the throttle; a pressure differential operated motor operably connected to the clutch, valve means for controlling the operation of the motor, and means interconnecting the accelerator, the manually operated means for opening the throttle, the valve means, and the throttle and operable to effect a synchronized operation of the valve means and throttle said interconnecting means including means operated by the manually operated throttle opening means for opening the throttle independently of its operation by the actuation of the accelerator said opening being effected prior to an opening of the throttle by the operation of the accelerator.

5. In an automotive vehicle provided with an engine controlling throttle, a clutch, an accelerator for controlling the operation of the throttle and clutch, and manually operated means for opening the throttle; a pressure differential operated motor operably connected to the clutch, valve means for controlling the operation of the motor, and means interconnecting the accelerator, the manually operated means for opening the throttle, the valve means, and the throttle and operable to effect a synchronized operation of the valve means and throttle, said interconnecting means including a ratchet mechanism operative to make possible an operation of the throttle by the manually operated throttle opening means independently of its operation by an actuation of the accelerator.

6. In an automotive vehicle provided with an engine controlling throttle, a clutch, and an accelerator for controlling the operation of the throttle and clutch; a pressure differential operated motor operably connected to the clutch, valve means for controlling the operation of the motor, and means interconnecting the accelerator, the valve means, and the throttle operable to effect a synchronized operation of the valve means and throttle said interconnecting means including a ratchet mechanism operative to make possible an operation of the throttle independently of its operation by an actuation of the accelerator, said ratchet mechanism including two relatively movable members one connected to the throttle and the other to the accelerator, together with manually operated means for moving the member connected to the throttle to thereby effect the throttle opening operation of the ratchet mechanism.

7. Mechanism for operating the choke and throttle valves of a carburetor of an automotive vehicle including a ratchet plate adapted to be connected to a throttle valve, a ratchet lever adapted to be connected to the accelerator pedal of the vehicle, a pawl member pivotally mounted on the ratchet lever, yieldable means for moving the ratchet plate and ratchet lever toward each other, other yieldable means for biasing the pawl member into engagement with the ratchet plate, and manually operated force transmitting means including a plurality of levers, connected to the ratchet plate, said force transmitting means serving, when operated, to effect a high idle operation of the choke and throttle valves said throttle opening operation being effected prior to an operation of the accelerator in its operation of opening the throttle.

8. Mechanism for operating the choke and throttle valves of a carburetor of an automotive vehicle including a member adapted to be connected to a throttle valve, a member adapted to be connected to the accelerator pedal of the vehicle, a pawl member pivotally mounted on the latter member, a spring for biasing the first two mentioned members toward each other, spring means for biasing the pawl member into engagement with the first mentioned member, and manually operated force transmitting means, including a plurality of levers, connected to the first mentioned member, said force transmitting means serving, when operated, to effect a high idle operation of the choke and throttle valves said throttle opening operation being effected prior to an operation of the accelerator in its operation of opening the throttle.

STEPHEN L. JANOWSKI.

REFERENCES CITED

The following references are of record in the file of this patent:

UNITED STATES PATENTS

| Number | Name | Date |
| --- | --- | --- |
| 1,719,718 | Moore | July 2, 1929 |
| 1,721,989 | Dixon | July 23, 1929 |
| 2,035,124 | Good | Mar. 24, 1936 |
| 2,101,275 | Starkey | Dec. 7, 1937 |
| 2,102,271 | Irving | Dec. 14, 1937 |
| 2,177,491 | Kliesrath | Oct. 24, 1939 |
| 2,217,940 | Bragg | Oct. 15, 1940 |
| 2,240,712 | Newton | May 6, 1941 |
| 2,251,350 | Bracke | Aug. 5, 1941 |